United States Patent
Knop et al.

(10) Patent No.: US 10,309,258 B2
(45) Date of Patent: Jun. 4, 2019

(54) METHOD FOR COMPENSATING LOAD PEAKS DURING ENERGY GENERATION AND/OR FOR GENERATING ELECTRICAL ENERGY AND/OR FOR GENERATING HYDROGEN, AND A STORAGE POWER PLANT

(71) Applicant: CARBON-CLEAN TECHNOLOGIES GMBH, Cologne (DE)

(72) Inventors: Klaus Knop, Sulzburg (DE); Robert Joseph Pfab, Cologne (DE); Lars Zoellner, Cologne (DE)

(73) Assignee: CARBON-CLEAN TECHNOLOGIES GMBH, Köln (DE)

( * ) Notice: Subject to any disclaimer, the term of this patent is extended or adjusted under 35 U.S.C. 154(b) by 123 days.

(21) Appl. No.: 15/519,622

(22) PCT Filed: Oct. 16, 2015

(86) PCT No.: PCT/EP2015/002050
§ 371 (c)(1),
(2) Date: Apr. 17, 2017

(87) PCT Pub. No.: WO2016/058701
PCT Pub. Date: Apr. 21, 2016

(65) Prior Publication Data
US 2017/0241296 A1    Aug. 24, 2017

(30) Foreign Application Priority Data

Oct. 17, 2014 (DE) .................. 10 2014 015 323
Nov. 25, 2014 (DE) .................. 10 2014 017 346

(51) Int. Cl.
*F01K 3/18* (2006.01)
*F01K 23/10* (2006.01)
(Continued)

(52) U.S. Cl.
CPC .................. *F01K 3/18* (2013.01); *F01K 3/00* (2013.01); *F01K 23/065* (2013.01);
(Continued)

(58) Field of Classification Search
CPC ........ F01K 3/18; F01K 23/065; F01K 23/101; F01K 3/00; Y02E 20/14; Y02E 20/16
(Continued)

(56) References Cited

U.S. PATENT DOCUMENTS

| 4,161,211 A | 7/1979 | Duffy et al. |
| 4,523,432 A * | 6/1985 | Frutschi .................. E21B 43/00 60/646 |

(Continued)

FOREIGN PATENT DOCUMENTS

| DE | 3931582 A1 | 4/1991 |
| EP | 2698505 A1 | 2/2014 |

OTHER PUBLICATIONS

International Search Report for corresponding International Application No. PCT/EP2015/002050, dated Jan. 15, 2016.
(Continued)

*Primary Examiner* — Hoang M Nguyen
(74) *Attorney, Agent, or Firm* — Jason H. Vick; Sheridan Ross, PC (57) ABSTRACT

A method is presented and described for compensating load peaks during the generating of electrical energy and/or for the generating of electrical energy by utilizing the heat of heated carrier gas (2) for the electricity generation, and/or for the utilization of the heat of heated carrier gas (2) for hydrogen generation, comprising the steps:

heating of carrier gas (2), especially hot air, in at least one gas heater (4*a-d*), wherein hot carrier gas (2) with a specified target charge temperature exits from the gas heater (4*a-d*), (Continued)

thermal charging of at least one heat storage module (5a-d) of a plurality of heat storage modules (5a-d) of the storage power station (1) by releasing heat from the hot carrier gas (2) from the gas heater (4a-d) to a heat storage material of the heat storage module (5a-d), time-delayed thermal discharge of at least one heat storage module (5a-d), preferably of a plurality of heat storage modules (5a-d), wherein colder carrier gas (2), especially cold air, flows through at least one heat storage module (5a-d) and heat from the heat storage material is transferred to the colder carrier gas (2) for the heating of the carrier gas (2) and wherein heated carrier gas (2) with a specified discharge temperature exits from the heat storage module (5a-d), and utilization of the heat transferred to the carrier gas (2) in a process for electricity generation and/or hydrogen generation.

13 Claims, 8 Drawing Sheets

(51) Int. Cl.
*F01K 23/06* (2006.01)
*F01K 3/00* (2006.01)

(52) U.S. Cl.
CPC ............. *F01K 23/101* (2013.01); *Y02E 20/14* (2013.01); *Y02E 20/16* (2013.01)

(58) Field of Classification Search
USPC ...................... 60/39.182, 650, 682–684, 659
See application file for complete search history.

(56) References Cited

U.S. PATENT DOCUMENTS

| | | | |
|---|---|---|---|
| 7,444,818 B1 | 11/2008 | Brostmeyer | |
| 2012/0137702 A1* | 6/2012 | Stevanovic | ........... F01K 23/067 60/781 |
| 2015/0113940 A1* | 4/2015 | Sinatov | ..................... F01K 3/02 60/39.182 |
| 2015/0218969 A1 | 8/2015 | Reznik et al. | |
| 2015/0260463 A1* | 9/2015 | Laughlin | ................... F02C 1/10 165/10 |

OTHER PUBLICATIONS

Written Opinion for corresponding International Application No, PCT/EP2015/002050, dated Jan. 15, 2016.

* cited by examiner

METHOD FOR COMPENSATING LOAD PEAKS DURING ENERGY GENERATION AND/OR FOR GENERATING ELECTRICAL ENERGY AND/OR FOR GENERATING HYDROGEN, AND A STORAGE POWER PLANT

CROSS REFERENCE TO RELATED APPLICATIONS

This application is a national stage application under 35 U.S.C. 371 of PCT Application No. PCT/EP2015/002050 having an international filing date of 16 Oct. 2015 which designated the United States, which PCT application claimed the benefit of German Application No. 10 2014 015 323.1 filed 17 Oct. 2014 and German Application No. 10 2014 017 346.1 filed 25 Nov. 2014, each of which are incorporated herein by reference in their entirety.

The invention concerns a method of compensating for load peaks during the generating of electrical energy and/or for the particularly decentralized generating of electrical energy, also in particular from regenerative energy sources such as biogas from biomass fermentation or synthesis gas from biomass gasification, or from fossil fuels such as natural gas, by utilizing the heat of heated carrier gas for the electricity generation, especially in a thermoelectric storage power station, and/or for the utilization of the heat of heated carrier gas for hydrogen generation, especially in a gasification process. Furthermore, the invention concerns a thermoelectric storage power station.

The development of renewable energy is leading to a change in the generation structure in the electricity market. Supply-dependent electrical energy from renewable energy sources such as wind power, biomass, and photovoltaics will make up a majority of the electricity supply in the future. The available technologies for electricity generation from regenerative energy sources, however, only permit a limited degree of precision in predictions of the volume of the electricity to be generated, so that fluctuations occur on various time scales, namely, ranging from seasonal fluctuations during the course of the day to short-term fluctuations. These fluctuations amplify the fluctuations occurring in electricity demand and increase the need for ways of compensating for load peaks. Compensation for load peaks at present is generally done through different market structures in which operators of different generating and storage technologies are participating. Furthermore, the energy system is faced with a conversion from a centralized to a decentralized generation of electrical energy from fossil and regeneratively produced energy sources. This is producing new requirements on the network infrastructure, since the problem of network stabilization is being shifted increasingly from the transmission network layer to the layer of the distribution networks. However, so far these have little infrastructure for the active control of the networks.

The problem which the present invention proposes to solve is to provide a method and a storage power station of the aforementioned kind which, with good economy and high efficiency, compensate for generation peaks and valleys in the generating of electrical energy and can thereby make a contribution to load management in the electricity network, wherein energy will be stored during times of high electricity generation and slight electricity demand and then released during load peaks. In particular, it should be possible to reduce excess capacity in the electricity network and provide electric power during brief high consumption peaks in the shortest of time. Furthermore, the method and the storage power station should enable, in particular, decentralized electricity generation and/or hydrogen generation with good economy and high efficiency.

The aforementioned problems are solved by a method with the features of claim 1 and by a storage power station with the features of claim 13. Advantageous embodiments will emerge from the subclaims.

The method according to the invention enables a utilization of the heat of highly heated carrier gas, especially hot air, for the electricity generation in a power station process or for hydrogen generation, especially in a gasification process, wherein first of all a carrier gas, such as air, is heated to a specified target charging temperature in at least one gas heater of a storage power station. The hot carrier gas serves for the thermal charging of at least one heat storage module of a plurality of heat storage modules of the storage power station, resulting in a release of heat from the hot carrier gas from the gas heater to a heat storage material of the heat storage module (charging cycle). In order to generate hot gas in sufficient amount and/or with sufficiently high target charging temperature for the charging of the heat storage modules, a plurality of gas heaters can be used. A maximum target charging temperature for the heating of the carrier gases in the gas heater may amount to 1000° C. to 1300° C., preferably 1100° C. to 1200° C. Each heat storage module can be matched up with a separate gas heater.

During the time-delayed thermal discharge of at least one heat storage module, preferably a plurality of heat storage modules, the usable stored heat or the usable caloric content of the heat storage modules is utilized for the heating of cold carrier gas, especially cold air, wherein cold carrier gas flows through at least one heat storage module and heat is transferred from the heat storage material to the carrier gas (discharge cycle). The carrier gas upon flowing through the heat storage module is heated to a specified discharge temperature and exits at this temperature level from the heat storage module. The specified discharge temperature required for a utilization of the heat can amount to at least 500° C., preferably at least 600° C., up to 900° C., more preferably up to 800° C. The heat of the hot carrier gas generated during a discharge cycle is then utilized in a power station or gasification process. Both the charging cycle and the discharge cycle can be associated with a partial or complete charging and discharge of a heat storage module. The usable caloric content of a heat storage module results from the specific heat capacity of the heat storage material, the mass of the heat storage material or the size of the heat storage module and the (mean) heat storage temperature achieved during a charging or discharging cycle or process.

For a utilization of the heat of the carrier gas for generating electricity in a power station process, it can be provided that heat from carrier gas heated in at least one heat storage module is transferred to a working fluid of the power station process, especially a working fluid of a steam power process. Preferably, the working fluid will be water. In particular, a utilization of the heat transferred to the carrier gas in a conventional steam power plant can be provided, wherein the power rating of the power plant is more than 5 MW, preferably more than 10 MW, more preferably more than 50 MW, especially preferably more than 100 MW. However, the power rating can also amount to several 100 MW. In a steam power process the heat of the carrier gas can be utilized for steam production, for preheating of the feed water, and/or for superheating of steam. Basically, however, it is also possible to supply the heat transferred to the carrier gas in the form of hot air to the combustion chamber of a (conventional) coal-fired power plant and/or a combined-cycle power plant, in order to burn a fuel such as coal or gas. The power rating of the coal-fired power plant and/or the combined-cycle power plant in this case can preferably correspond to the above mentioned power rating of a steam power plant. Alternatively, the invention also enables a utilization of the heat transferred to the carrier gas in a gasification process in order to generate hydrogen. For example, steam can be generated with the heat, which can then be used in an allothermal coal gasification process.

The thermoelectric storage power station according to the invention can comprise at least one compressor for compressing the carrier gas, at least one gas heater for heating the carrier gas, a plurality of heat storage modules for storing the heat of heated carrier gas and at least one heat exchanger, such as a steam generator, for transferring the heat from heated carrier gas to a working fluid of a steam power process. Of course, the storage power station according to the invention can furthermore comprise additional components of a steam power plant known from the prior art, such as a feed water pump, a condenser and a steam turbine.

If the heating of the carrier gas is done in the gas heater by transformation of electrical energy into thermal energy, for which purpose the gas heater can comprise at least one electrical heating resistor, the method according to the invention and the storage power station according to the invention make a contribution to the load management in the electricity grid, storing electrical energy in the form of heat during a charging cycle at times of high electricity production and low electricity demand. During load peaks, at least one heat storage module is then discharged in a discharge cycle and the hot carrier gas so produced is used for electricity production, for example, to turn water into steam for a steam power process. The electrical energy produced can again be released to the electricity grid. An operator of the storage power station according to the invention can offer system services and take part in the regulated energy market. Thanks to the heat storage modules used, a simple and economical storage of electrical energy in the form of heat is possible, wherein electric power can be made available in a flexible and very brief as well as economical manner during transient high consumption peaks.

Especially preferably, a purely electrical heating of the carrier gas in at least one electrical air heater is provided by the transformation of electric energy into thermal energy. It is then not necessary to burn a fuel in order to produce hot carrier gas, so that an additional releasing of carbon dioxide is avoided.

The production of a hot carrier gas can also alternatively or additionally be done by the burning of at least one fuel in at least one combustion chamber of the gas heater, for example by the burning of biogas from biomass fermentation and/or synthesis gas from biomass gasification. The use of natural gas is also possible and advantageous. Of course, an energy production is also possible with the use of other fossil fuels, such as synthesis gas from coal gasification. Solid fuels can also be used. Thus, the power station according to the invention can help cover the base load, for example, in the vicinity of a biogas plant, which enables an economical electricity production. In particular, the power station according to the invention is distinguished for being an isolated operation, when electricity is produced in a decentralized manner from preferably regeneratively produced fuels.

It may be expedient for the hot gas production in the air heater to be equally possible by transforming electrical energy into thermal energy and by burning at least one fuel. In this way, needs-based support of the grid infrastructure is possible by compensating for load peaks and generating electricity to cover the base load.

It is not ruled out that waste heat or process heat from a secondary process also be utilized in the gas heater for the production of hot gas.

In one expedient embodiment of the method according to the invention, a plurality of heat storage modules connected in series can form a heat storage series, wherein a carrier gas is heated in at least one gas heater to a specified target charging temperature and then flows in succession through several heat storage modules of the heat storage series, especially all the heat storage modules. The heat storage modules are in this way heated or "charged" to the same or different heat storage temperatures depending on the size of the hot gas volume flow, the level of the target charge temperature of the hot carrier gas at the exit from the gas heater, the size of the particular heat storage module and/or the thermal capacity of the heat storage material used. Preferably, all heat storage modules are outfitted the same and have equal-sized usable caloric contents in the fully charged state.

In an especially preferred embodiment, there is provided an at least pairwise actuation of several heat storage modules. The at least pairwise actuation of heat storage modules simplifies the design of the heat storage modules in terms of required pipeline lengths and their interconnection and thus enables an economical fabrication of the modules. By a "pairwise actuation" in the sense of the invention is meant the joint actuating of at least two heat storage modules, preferably precisely two heat storage modules, for charging, i.e., for the joint charging in series connection to allow for the flow of hot carrier gas through them. At least two heat storage modules can form a heat storage pair. Several heat storage pairs of a heat storage system can be actuated independently of one another or separately. This can be achieved by a suitable pipeline layout and valve control in the heat storage system. During the charging of a heat storage pair, the heat storage modules of the particular heat storage pair can then be arranged in series and the carrier gas can flow through them in succession. Accordingly, a pairwise actuation can be provided for the discharge of the heat storage modules.

Basically, a separate actuating of heat storage modules during the charging and/or discharging is also possible, in which case each individual heat storage module is actuated as needed, i.e., it can be opened up for a flow of carrier gas through it.

Hot carrier gas from a gas heater with a high, preferably with a maximum target charge temperature can enter into at least the first heat storage module of a heat storage series, in which case the hot carrier gas cools down during the charging of the first heat storage module and exits with a lower exit temperature from the heat storage module. The carrier gas is then taken to the next heat storage module of the heat storage series for charging. With increasing degree of charging of a heat storage module or with increasing heat uptake of the storage material, the exit temperature of the carrier gas flowing from the particular heat storage module also increases during a charging cycle. The exit temperature of the carrier gas upon exiting from a preceding heat storage module corresponds preferably substantially to the entrance temperature of the carrier gas upon entering the next heat storage module. Preferably the heat storage modules of a heat storage series are heated to different degree during a charging cycle, where the heat content of the heat storage modules attained during a charging cycle and usable during the discharge and preferably the heat storage temperature decrease in stages in the flow direction of the carrier gas from one heat storage module to another. Accordingly, the exit temperature of the carrier gas decreases from one heat storage module to another.

Again preferably, during each charging cycle at least a last heat storage module of the heat storage series is not fully charged. The carrier gas can then exit cold at the end of a charging cycle from this heat storage module, that is, with an exit temperature of, for example, less than 100° C., preferably less than 50° C., especially less than 30° C. Thanks to the described procedure, during the charging, a simple and economical storage of electrical energy is possible, wherein the heat contained in the carrier gas can be stored almost completely in the heat storage modules and again be made available in the near term.

The carrier gas exiting from a heat storage module during its charging can be utilized for the charging of a following heat storage module of the heat storage series, until the exit temperature of the carrier gas from the preceding heat storage module drops below a specified minimum exit temperature. The minimum exit temperature can be less than 200° C., preferably less than 100° C., more preferably less than 50° C., especially preferably less than 30° C. If the minimum exit temperature is still high enough, the carrier gas exiting from a heat storage module can be utilized for the purpose of maintaining warmth, for example, in the steam power process.

During the charging of several heat storage modules connected in series, the charging of a following heat storage module of the series can also be done at least partly by direct supply of hot carrier gas from a gas heater, especially if the exit temperature of the carrier gas from a preceding heat storage module of the series drops below a specified minimum exit temperature. The directly supplied hot carrier gas from the gas heater may then have the target charge temperature which is reached in the gas heater, so that a preferably complete charging of a following heat storage module is possible. If the exit temperature of the carrier gas from a preceding heat storage module does not drop below a specified minimum temperature, yet is not high enough to enable a complete charging of the following heat storage module, the charging of the following heat storage module can be done by the carrier gas from a preceding heat storage module of the heat storage series and by supplying hot carrier gas from the gas heater. Thus, thanks to the direct supply of hot carrier gas, a definite high charging state of the following heat storage module can be achieved in simple manner.

Basically, it is also possible to charge several heat storage modules in parallel, each heat storage module being supplied with a separate hot carrier gas stream. Preferably, here as well, at least a pairwise actuation of several heat storage modules can be provided. For example, at least every two heat storage modules can form a heat storage unit or a heat storage pair. Several heat storage units can be charged in parallel, but the individual heat storage modules of a heat storage unit are hooked up in series and carrier gas flows through them in succession. The heat storage units can preferably be actuated independently of each other. A corresponding control system can be provided for the discharge.

Several gas heaters can be provided in order to generate separate carrier gas streams, each heat storage module being assigned to at least one gas heater. From each gas heater a carrier gas stream emerges with a specified target charging temperature for the charging of the associated heat storage module. The target charge temperatures of the carrier gas streams can be the same or different. Preferably, a maximum target charge temperature is achieved in all gas heaters between 1000° C. and 1300° C. The parallel charging of several heat storage modules makes possible in particular a simultaneous high, preferably complete, charging of the heat storage modules in very short time.

In order to create a heated carrier gas stream for providing heat in the power plant and/or gasification process, several heat storage modules can be discharged in parallel, each heat storage module being assigned a separate cold carrier gas stream. In order to provide hot gas of a specified target discharge temperature for utilization of heat in the power plant and/or gasification process, it is advisable to discharge at least one heat storage module with a lower heat storage temperature and at least one heat storage module with a higher heat storage temperature in parallel and to merge the heated carrier gas so produced from both heat storage modules in order to adjust a specified target discharge temperature. Preferably it is provided that a heat storage module with the relatively lowest heat storage temperature and at least one heat storage module with a relatively next higher heat storage temperature from a plurality of heat storage modules are discharged in parallel in order to provide a carrier gas stream with a desired target discharge temperature. The discharge of the heat storage modules is preferably done at the same time. As a result, at least two different hot carrier gas streams are mixed in order to adjust or regulate a specified target discharge temperature of the carrier gas required for the subsequent heat transfer to the power plant and/or gasification process. This target discharge temperature can be kept constant by a suitable volume regulation of the merged carrier gas streams over the entire discharge cycle of the heat storage modules. The mixing of different warm carrier gas streams enables a simple regulation of the target discharge temperature and a complete discharge of heat storage modules whose heat content is too low to heat a particular carrier gas stream to the target discharge temperature. A charged heat storage module with a lower heat content and/or with a lower heat storage temperature can thus be used during a discharge cycle as a bypass for a charged heat storage module with a higher heat content and/or a higher heat storage temperature.

Alternatively and/or in addition, a merging of heated carrier gas during the discharge of at least one heat storage module with cold carrier gas, especially cold air, can be provided in order to accomplish a cooldown of the heated carrier gas to a specified target discharge temperature of the carrier gas. This allows a simple and precise regulating of the target discharge temperature of the carrier gas.

In order to ensure a certain (high) target discharge temperature for the heat utilization in a process for the production of electricity and/or hydrogen, it can also be provided that carrier gas heated in at least one heat storage module is mixed directly with hot carrier gas from the gas heater. The carrier gas from the gas heater is preferably at the maximum target charge temperature.

Furthermore, the heat transferred to the carrier gas in a gas heater can also be utilized directly, without interim storage of the heat in a heat storage module, in a process for the production of electricity and/or hydrogen. For example, it is possible for a portion of the hot carrier gas heated in the gas heater to bypass the heat storage modules and be supplied to at least one steam generator of the steam power process in order to keep the steam generator warm during a charging cycle of the heat storage module.

In one preferred embodiment of the method according to the invention, during a discharge cycle at least one heat storage module is fully discharged and at least one heat storage module is only partly discharged. During a complete discharge, the exit temperature of the carrier gas from the heat storage module at the end of the discharge cycle is preferably less than 200° C., preferably less than 100° C., more preferably less than 50° C., especially preferably less than 30° C. In particular, it is provided in this context to fully discharge at least one heat storage module whose usable heat content and/or whose heat storage temperature is too low to heat the carrier gas by itself to a specified target discharge temperature, which depends of course on the size of the carrier gas volume flow. On the other hand, heat storage modules with higher heat content, especially a higher heat storage temperature, are not fully discharged during a discharge cycle. This applies especially to the first heat storage module or several heat storage modules of a heat storage series through which hot carrier gas flows at first during a charging cycle and which are heated to a storage temperature above the target charge temperature. Advisedly, during a discharge cycle, at first the heat storage module with the lowest heat content, especially the lowest heat storage temperature, is discharged and then heat storage modules each with increasing usable heat content and/or each with rising heat storage temperature.

During very high demand for electrical energy, it is of course also possible to fully discharge all heat storage modules. Depending on the heat content of a heat storage module and/or the heat storage temperature, a temperature regulation may also be required by supplying of cold carrier gas in order to maintain a specified target discharge temperature. In this way, the required target discharge temperature can be reliably maintained.

The hot carrier gas generated during a discharge cycle can also be used according to the invention for steam generation in a steam power process, wherein the electrical efficiency of the storage power station can be boosted in that the heated carrier gas at first is expanded in an expander or a gas expansion turbine of the storage power station and then supplied to a steam generator. The absolute pressure of the carrier gas before entering the gas expansion turbine may be up to 20 bar. For this purpose, a corresponding compression of the cold carrier gas is provided. If the electricity generation is done only in the steam power process, an absolute pressure of the carrier gas between 2 and 5 bar, preferably between 3 and 4 bar, is enough to supply the heated carrier gas to a steam generator. Here as well, an upstream expander or a gas expansion turbine can be provided in order to boost the electrical efficiency of the storage power station. The expander can be provided downstream from the heat storage modules in the flow direction of the carrier gas and upstream from a steam generator.

In the utilization of the heat storage power station to cover the base load, the carrier gas can be heated in at least one gas heater and then be used directly in the steam process for generation of steam, that is, without charging and discharging the heat storage modules. In particular, it may be provided here that carrier gas is heated in the gas heater by the burning of a fossil fuel, such as natural gas. Alternatively, of course, it is also possible to use non-fossil fuels, such as biogas. Moreover, in particular, an indirect heating of the carrier gas can be provided, so as not to contaminate the carrier gas with combustion gases.

In order to reduce environmentally harmful emissions, a circulation of the carrier gas can be provided. The carrier gas in this case is not vented to the surroundings after the heat transfer to the working fluid, but instead utilized for another charging of the heat storage modules. There may be a substantially closed carrier gas system. If the carrier gas is vented to the surroundings after a heat transfer to the working fluid, on the other hand, there is an open carrier gas system, which requires a supply of fresh carrier gas for a subsequent charging cycle.

Further features, benefits and application possibilities of the present invention will emerge from the following description of sample embodiments with the help of the drawing and from the drawing itself. All features described and/or graphically portrayed, either alone or in any given combination thereof, form the subject matter of the present invention, regardless of their summarization in the claims or through reference back to the claims.

FIGS. 1 to 4 show a thermoelectric storage power station 1 for utilization of the heat of heated carrier gas 2 for electricity generation, with a compressor 3 for compressing the carrier gas 2, with a plurality of gas heaters 4a-d for heating the carrier gas 2, with a plurality of heat storage modules 5a-d for storing the heat of heated carrier gas 2 and with a steam generator 6 for the transfer of the heat from heated carrier gas 2 to a working fluid 7 of a steam power process. The carrier gas 2 is preferably air or some other suitable gas. The working fluid 7 is preferably water.

Each gas heater 4a-d in the present case comprises a combustion chamber 8 for the use of a gaseous fuel 8a in particular, such as biogas or natural gas, and an electric heater 9, having heating conductors, such as ones made of silicon carbide or a suitable metal, and which can be connected to a power source. When the power source is switched on, the heating conductors heat up and give off their heat to the carrier gas 2. The carrier gas 2 with suitable design of the gas heater 4a-d can be heated to a target charge temperature of, for example, 1200° C. at maximum. The target charge temperature is dictated by a control and/or regulating mechanism, not shown.

Figure 1:
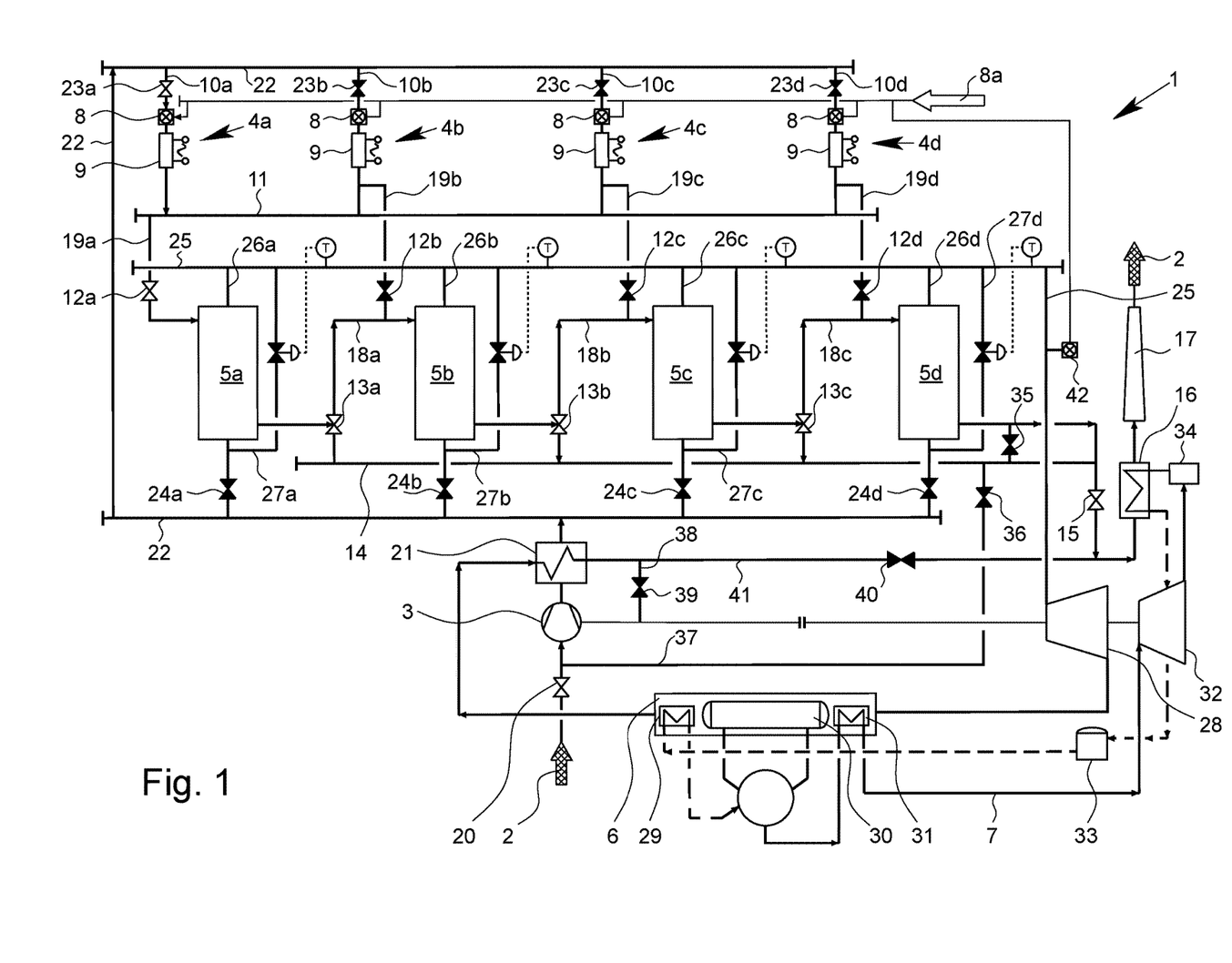
FIG. 1 a schematic process flow chart of a method according to the invention for compensating for load peaks in the generating of electrical energy and/or in particular for the decentralized generating of electrical energy in a storage power station according to the invention with a plurality of heat storage modules during the charging of the heat storage modules, wherein an open carrier gas system is provided, FIG. 2 a schematic process flow chart of the method according to the invention per FIG. 1 during the discharge of the heat storage modules, FIG. 3 a schematic process flow chart of an alternative embodiment of the method according to the invention during the charging of the heat storage modules, wherein a closed carrier gas system is provided, FIG. 4 a schematic process flow chart of the method according to the invention per FIG. 3 during the discharge of the heat storage modules, and FIGS. 5 to 8 schematic representations of the possible interconnecting of four heat storage modules during charging and discharging.

In order to compensate for load peaks in the generation of electric energy, the carrier gas 2 is at first heated in at least one gas heater 4 to the target charge temperature. The volume regulation of the system is designed so that, depending on the supply of electric energy, the specified target charge temperature for the carrier gas 2 is maintained at the exit from a gas heater 4a-d. It is also possible to operate several gas heaters 4a-d at the same time for the heating of the carrier gas 2, each time supplying a partial stream of the carrier gas 2 to a gas heater 4a-d by a gas line 10a-d and heating it there. The partial streams after the heating can also be brought together by a collecting line 11 and be supplied to a first heat storage module 5a in order to charge the heat storage module 5a with heat by releasing heat from the heated carrier gas 2 to a heat storage material of the heat storage module 5a. For the charging of the first heat storage module 5a, a supply valve 12a is opened, while other supply valves 12 b-d which connect the other heat storage modules 5b-d to the associated gas heaters 4b-d are closed.

In the embodiment shown, the heat storage modules 5a-d are hooked up in series and form a heat storage series, wherein the carrier gas 2 heated to the target charge temperature in the gas heater 4a during a charging cycle then flows through the heat storage modules 5b-d of the heat storage series and the heat storage modules 5a-d are heated. The carrier gas 2 at the beginning of the charging cycle leaves the heat storage module 5a across a three-way valve 13a, being at first cold. With increasing heat uptake from the storage material, the temperature of the carrier gas 2 flowing out from the heat storage module 5a increases.

The three-way valve 13a has two switching possibilities. The carrier gas 2 can either be taken via the collecting line 14, the outlet valve 15 and a heat exchanger 16 to a chimney 17 as vented air. But for a charging of the following heat storage modules 5b-d, the carrier gas 2 if its heat content or heat storage temperature is sufficient is taken across the three-way valves 13a-c to the following heat storage modules 5b-d. This occurs via the supply lines 18a-c. In this way, the thermal energy contained in the carrier gas 2 can be stored almost completely in the heat storage modules 5a-d.

The heat storage module 5b is preferably designed such that cold carrier gas 2 still emerges from the heat storage module 5b even when the heat storage module 5a is fully charged. A full charging occurs when the exit temperature of the carrier gas 2 from the heat storage module 5a corresponds to the entrance or target charge temperature of, for example, 1200° C. The carrier gas 2 leaving the heat storage module 5a is taken across the three-way valve 13b and the supply line 18b to the third heat storage module 5c. Alternatively, the carrier gas 2 can be vented to the surroundings via the collecting line 14. The possibility exists of likewise charging the heat storage module 5d or switching in other heat storage modules, not shown.

The gas heaters 4a-d can supply the individual heat storage modules 5a-d with heated carrier gas 2, which is possible via the charging lines 19a-d and possibly other valves, not shown. In this way, a heat storage module 5b-d can be fully charged even when the heat content of the carrier gas 2 coming from the preceding heat storage module 5a-c is not enough for a full charging of the following heat storage modules 5b-d. Preferably, however, it is provided that the hot carrier gas streams generated in the gas heaters 4a-d are merged by the collecting line 11 and flow through the heat storage modules 5a-d in succession, starting from the first heat storage module 5a, for a charging of hot gas.

It is not depicted that, during a charging cycle of the heat storage modules 5a-d, a partial stream of the hot carrier gas 2 from the collecting line 11 can be mixed with a partial stream of cold carrier gas 2, supplied via the compressor 3, and supplied to the steam generator 6 to keep it warm. The temperature regulation can be done in terms of the size of the volume flows.

The heat storage modules 5a-d can be thermally insulated vessels in which a heat storing material, such as a ceramic bead fill, is disposed. Suitable heat storage materials are known to a skilled person. The heat storage material is heated up by the hot carrier gas 2 as the carrier gas 2 cools down. With a suitable design of the heat storage modules 5a-d, the efficiency of the transformation of electric power into heat and the transfer of the heat to the storage material can be more than 90%, preferably more than n 95%.

During the charging of the heat storage modules 5a-d, the supplying of carrier gas 2 occurs via an opened supply valve 20 to the compressor 3, with which carrier gas 2 can be supplied across a preheater 21 and a collecting line 22 as well as other supply valves 23a-d to the gas heaters 4a-d. According to FIG. 1, the entire carrier gas 2 is taken only to the first gas heater 4a when the supply valve 23a is open. The supply valves 23b-d are closed. But basically, as described above, a heating of the carrier gas 2 can also be provided in several or all gas heaters 4a-d.

Figure 2:
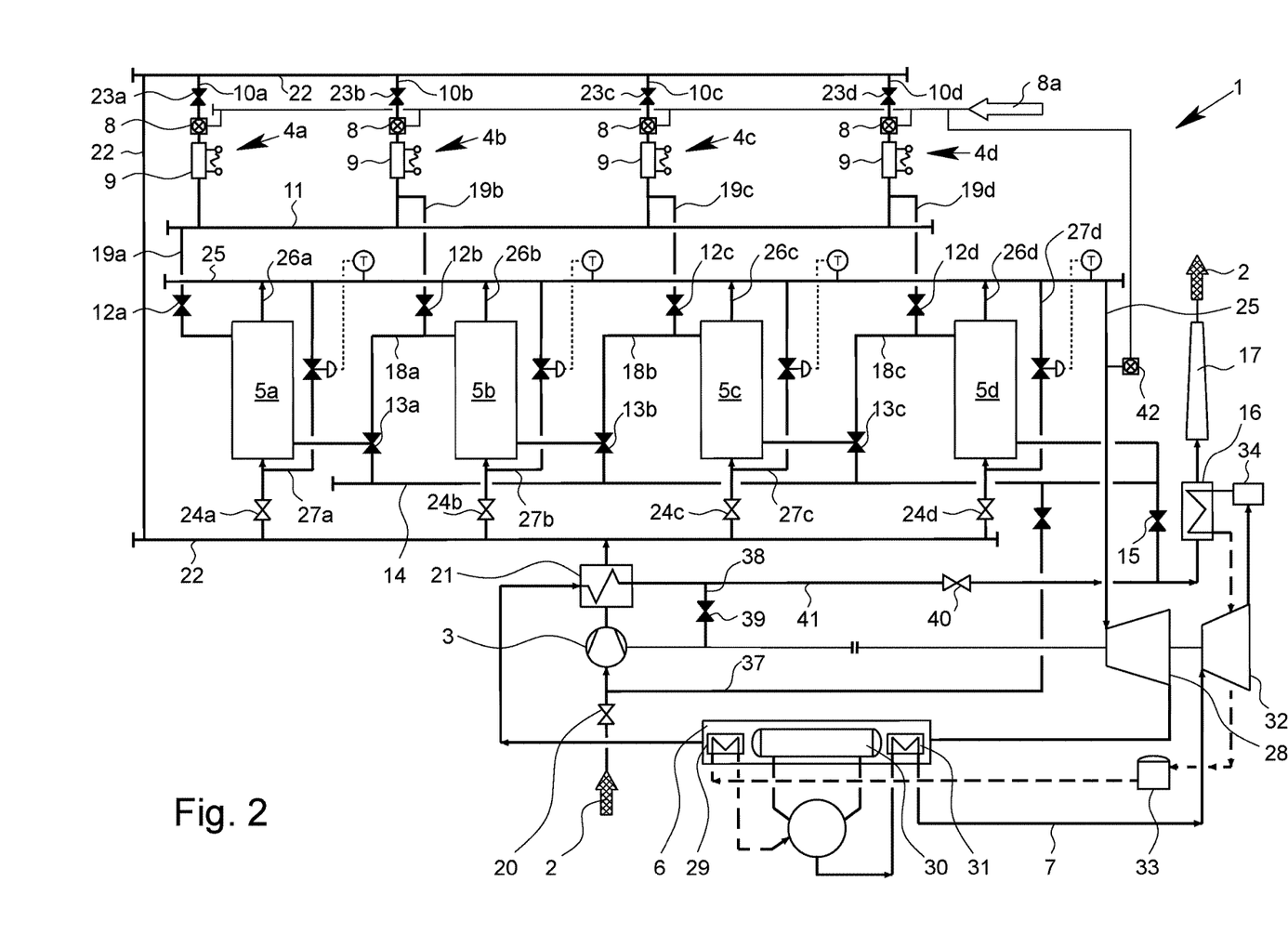

FIG. 2 shows schematically the discharge of the heat storage modules 5a-d of the storage power station 1 shown in FIG. 1. For the discharge mode, the supply valves 23a-d are closed. Instead, other supply valves 24a-d are opened, so that cold carrier gas 2 for a parallel discharge of the heat storage modules 5a-d is forced across the compressor 3 and the collecting line 22 into the heat storage modules 5a-d. In this process, the carrier gas 2 is heated in the heat storage modules 5a-d. Optionally, the carrier gas 2 can be taken in parallel across all heat storage modules 5a-d or it is possible to discharge only one or more heat storage modules 5a-d. The carrier gas 2 after exiting from the heat storage modules 5a-d can be brought together in a further collecting line 25. For this, the collecting line 25 is connected by exit lines 26a-d to the heat storage modules 5a-d. From the heat storage modules 5a-d, the carrier gas 2 exits at most with the target charge temperature of 1200° C.

Furthermore, preheated carrier gas 2 can go by bypass lines 27a-d at least partly past the heat storage modules 5a-d and be fed to the collecting line 25. In this way, it is possible to mix hot carrier gas from the heat storage modules 5a-d and cold carrier gas 2 by an appropriate volume regulating system so that the desired target discharge temperature of the hot carrier gas 2 is adjusted. This target discharge temperature can be, for example, between 600° C. and 800° C. This temperature is preferably kept constant over the entire discharging operation. If the exit temperature of the carrier gas 2 coming from a heat storage module 5a-d is higher than the desired target discharge temperature, a temperature regulation can be done via the respective bypass lines 27a-d.

When the heat storage modules 5a-d are arranged in a heat storage series, it can be provided to empty the heat storage modules 5a-d in dependence on the usable heat content and/or the heat storage temperature of the particular heat storage modules 5a-d, wherein starting with a heat storage module 5d which may have the lowest heat content and/or the lowest heat storage temperature the heat storage modules 5c, 5b, 5a are discharged in succession, that is, in the reverse of the direction of charging. Thus, the discharge begins preferably with the heat storage module having the lowest usable heat content and/or the lowest heat storage temperature. After this, the respective heat storage module which has the lowest usable heat content or the lowest heat storage temperature in comparison to the remaining heat storage modules is discharged. However, not all heat storage modules 5a-d need to be fully discharged. Thanks to the described method, a high system efficiency can be achieved and the generated electric power can be adapted according to the actual needs.

For example, if the exit temperature of the carrier gas 2 from the last heat storage module 5d of the heat storage series falls below a specified target discharge temperature, a partial stream of the carrier gas 2 is transferred across the preceding heat storage 5c in the heat storage series with a higher heat content and/or a higher heat storage temperature.

The carrier gas streams are merged together, so that the target discharge temperature is established. The heat storage module 5d then serves as a bypass, which is operated for as long as it takes to fully empty the heat storage module 5d. The desired target discharge temperature of the carrier gas 2 is achieved in this case by discharging at least one upstream heat storage module 5a to 5c of the heat storage series, once again possibly having the temperature regulated by supplying cold carrier gas 2 across at least one bypass line 27a-d.

The compressor 3 compresses the carrier gas 2 preferably to a system pressure of up to 20 bar. The hot carrier gas 2 produced during a discharge cycle is taken across the collecting line 25 to an expander 28 and expanded in the expander 28. In this process, the carrier gas 2 cools down, depending on its pressure level. If the use of an expander is not provided, the system pressure can be significantly lower and, for example, may be only between 3 and 4 bar (absolute). The carrier gas 2 exiting from the expander 28 serves for the generating and superheating of high-pressure steam in the steam generator 6. The steam generator 6 may have a preheater 29, a steam drum 30 and a superheater 31. Otherwise, the steam generator 6 corresponds to a typical design. The steam generated is taken to a steam turbine 32. The expander 28 and the steam turbine 32 are connected to a generator, not shown. Moreover, a deaerator 33 and a condenser 34 can be provided.

The electrical efficiency of the storage power station 1 can reach 60%. Furthermore, it is possible to divert heat for district heating. The thermal efficiency of remote heat utilization can reach 98%. Moreover, process steam can be diverted out from the storage power station 1.

Figure 3:
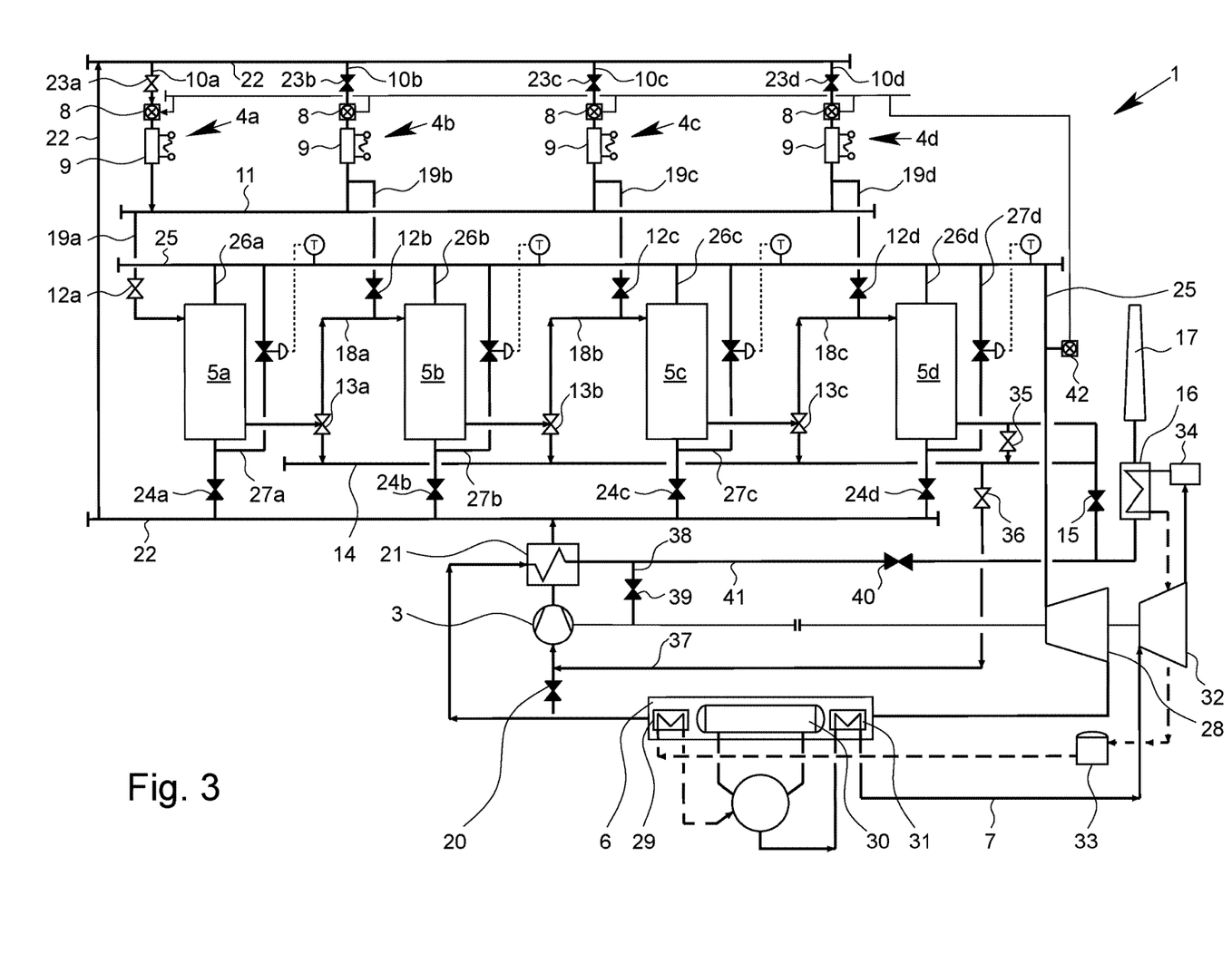

While FIGS. 1 and 2 show an operation of the storage power station 1 with an open carrier gas system, the carrier gas 2 being vented as waste air into the surroundings through the chimney 17, the possibility exists for taking the carrier gas 2 in a circuit. This is shown schematically in FIGS. 3 and 4, where FIG. 3 shows the state during a charging cycle and FIG. 4 the state during a discharge cycle.

Figure 4:
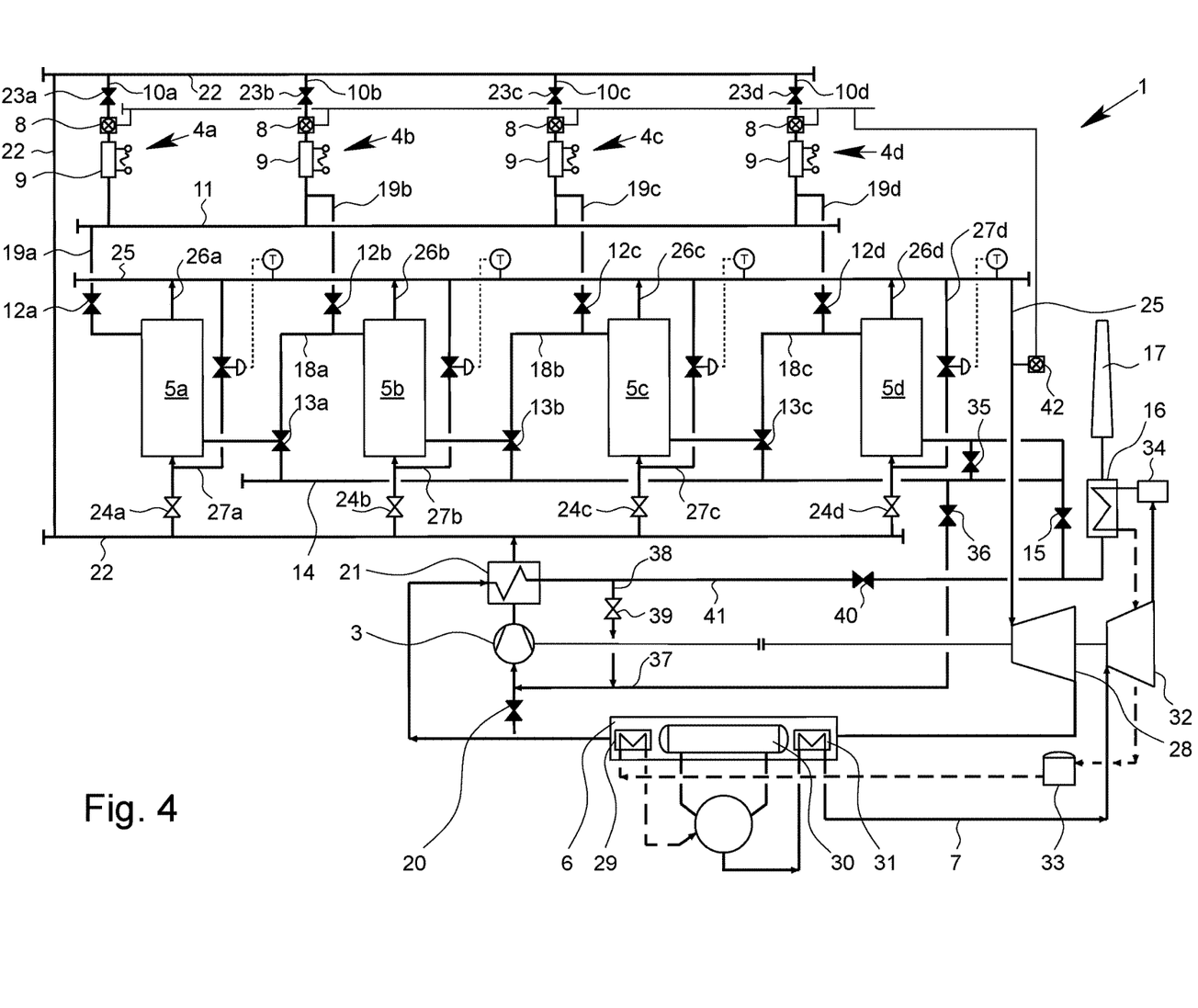

In the closed carrier gas system, preferably no supply of fuel gas and no burning of fuel gas in the combustion chambers 8 of the gas heaters 4a-d is provided, but it is possible in the case of indirect heat transfer. Instead, the heating of the carrier gas 2 is done preferably and exclusively by means of thermal conductors by transforming electric energy into thermal energy. If the carrier gas 2 is taken in a circuit, the outlet valve 15 is closed during the charging of the heat exchange modules 5a-d. Instead, the circulation valves 35, 36 are opened, so that carrier gas emerging from a heat storage module 5a to 5d is taken across the collecting line 14 and a circulation line 37 to the compressor 3. The supply valve 20 is closed, so that no supply of fresh carrier gas 2 to the carrier gas system occurs. In a discharge cycle, the carrier gas 2 after passing through the preheater 21 is taken across a return line 38, an opened return valve 39 and the circulation line 37 to the compressor and is then available for another charging of the heat storage modules 5a-d. The circulation valves 35, 36 and another outlet valve 40, which allows the carrier gas 2 during the discharge to be discharged in the open carrier gas system across an outlet line 41 and the chimney 17 (FIG. 2), are closed.

As moreover appears from FIGS. 1 and 2, a further combustion chamber 42 can be provided as part of a further gas heater, with which it is possible to heat the carrier gas 2 before entering the expander 28 by the burning of fuel gas 8a to a certain target temperature of, for example, 600° C. to 800° C. The gas heater can be designed for direct or indirect heat transfer. This allows for the utilization of the storage power station 1 to cover the base load, for which a charging and discharging of the heat storage modules 5a-d is not required. Furthermore, the combustion chamber 42 can serve to provide hot gas during the charging of the heat storage modules 5a-d for keeping machinery warm. The heating of the carrier gas in the combustion chamber 42 can furthermore help lower the electricity production costs.

Figure 5:
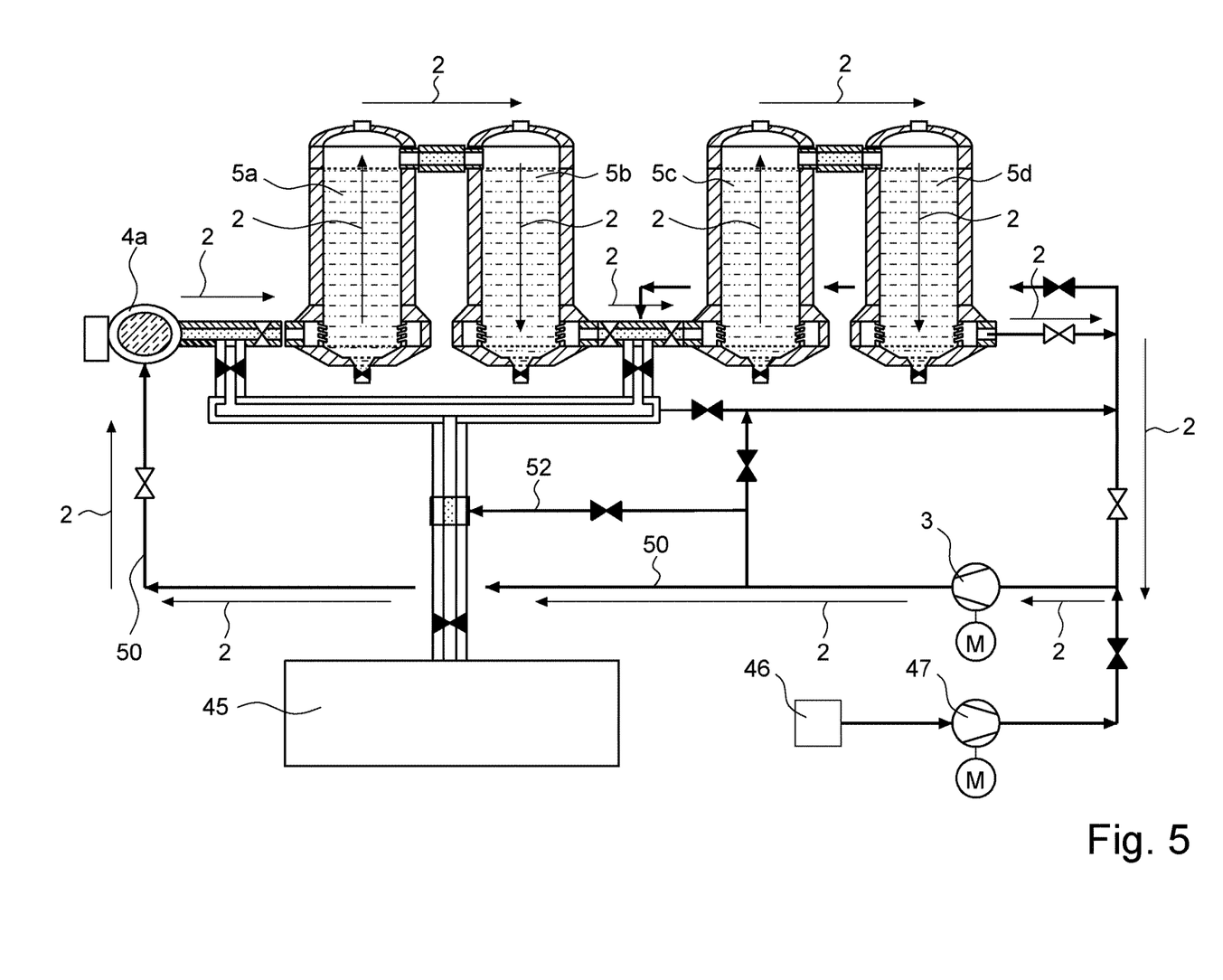
Figure 6:
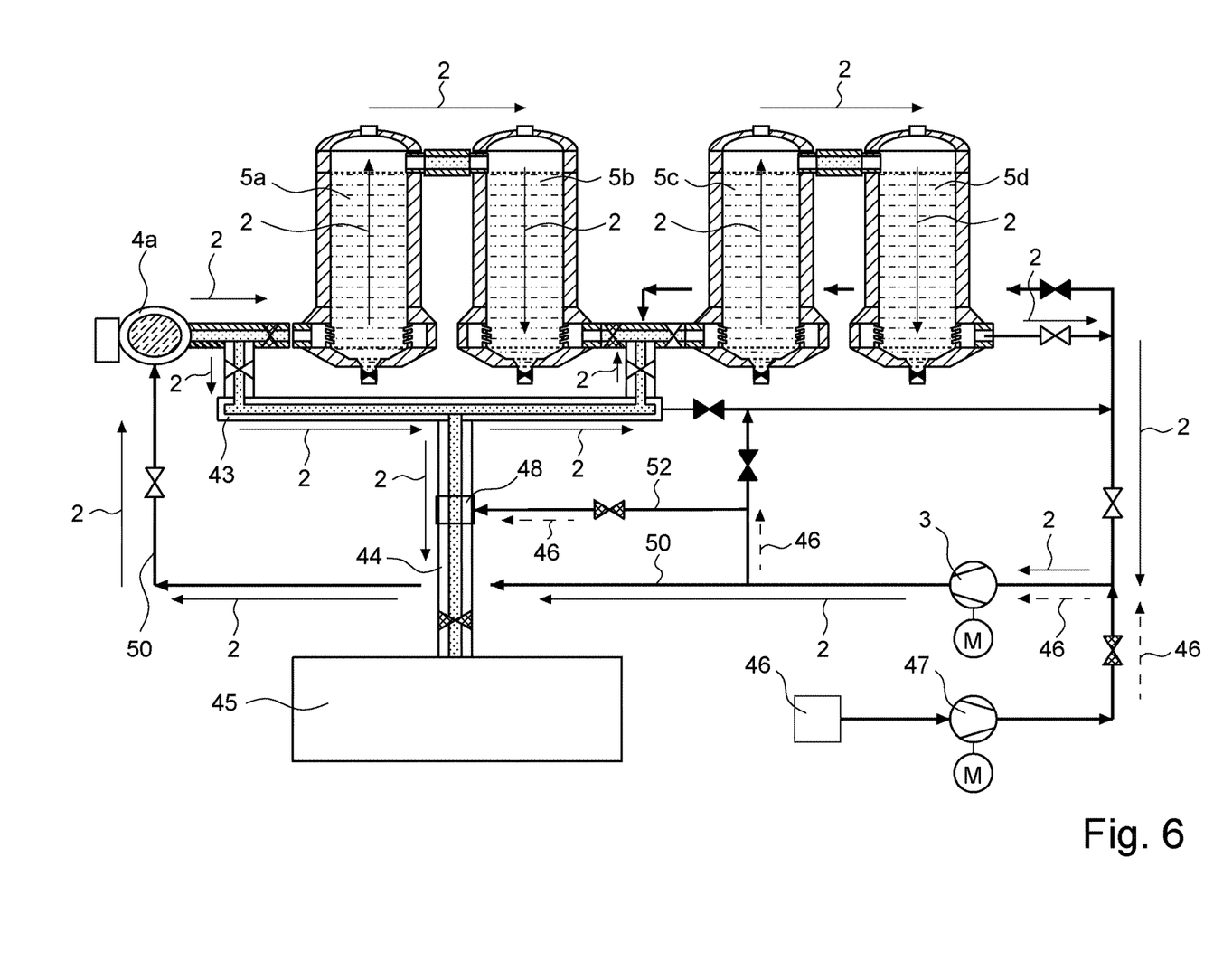
Figure 7:
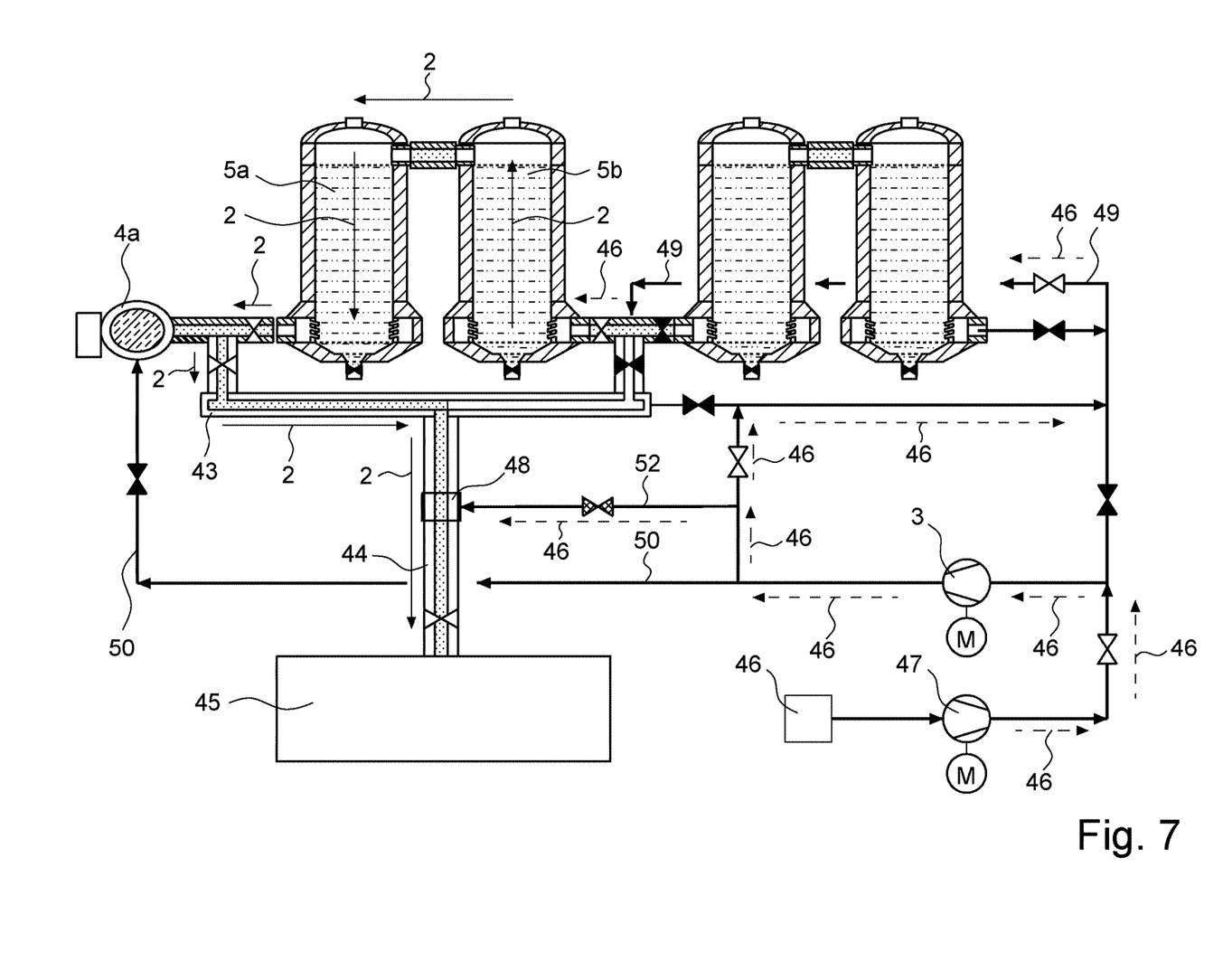
Figure 8:
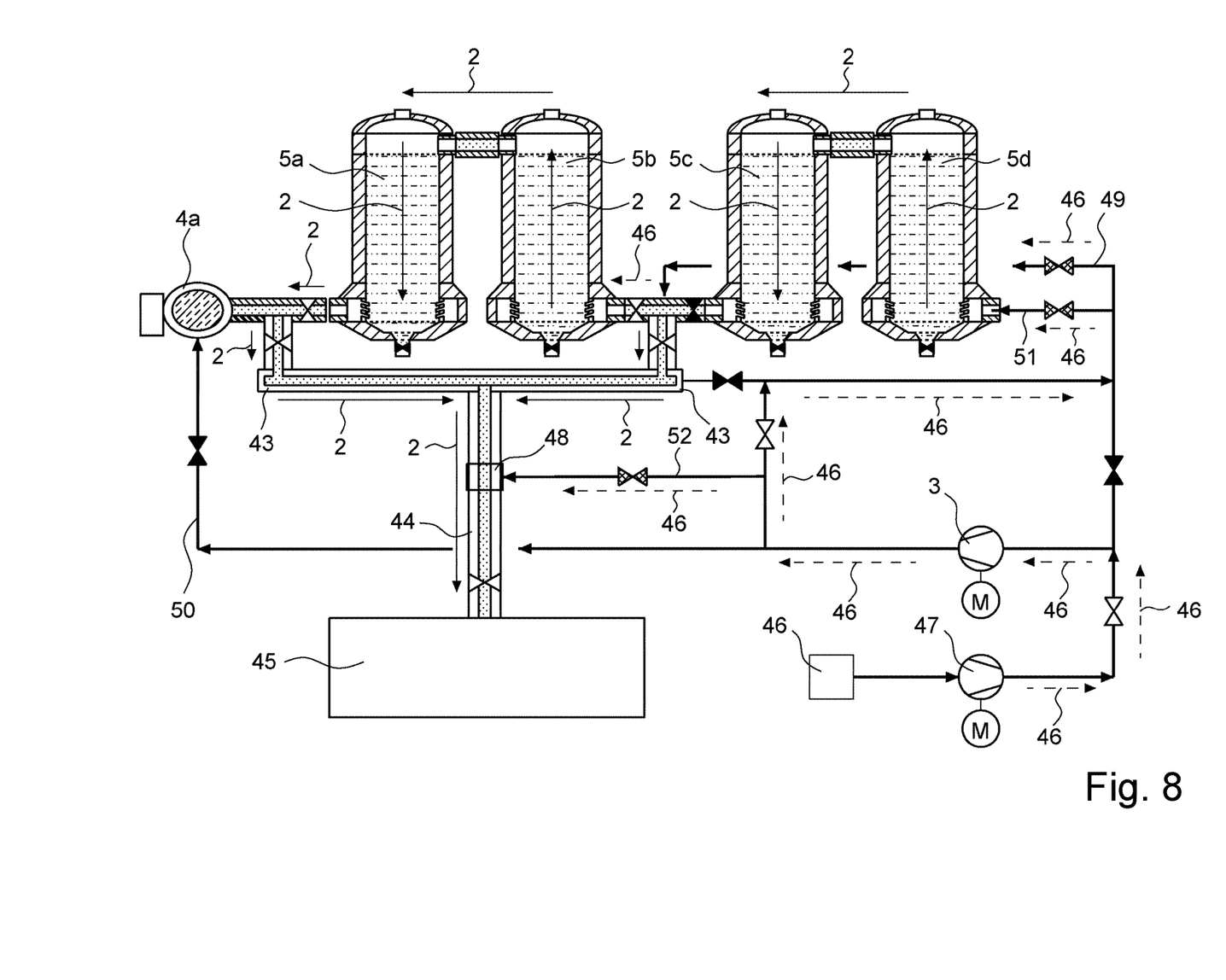

FIGS. 5 to 8 show schematically a connection example for the charging and discharging of four heat storage modules 5a-d. FIG. 5 and FIG. 6 show the connection during charging of the heat storage modules 5a-d, while FIG. 7 and FIG. 8 show the connection during discharge of the heat storage modules 5a-d.

For the charging of the heat storage modules 5a-d, carrier gas 2 is heated in a gas heater 4a, which is designed as an air heater, and then taken per FIG. 5 to the heat storage modules 5a-d. The carrier gas 2 can be air. The hot carrier gas 2 from the gas heater 4a flows successively through the series-connected heat storage modules 5a-d. The heat storage modules 5a-d can be actuated in pairs for carrier gas 2 to flow through them. This holds equally for charging and discharging. In the embodiment shown, the first two heat storage modules 5a and 5b shown at the left in FIGS. 5 to 8 and the other heat storage modules 5c and 5d shown at the right are each matched up with one heat storage pair or one heat storage unit, the heat storage pairs being actuated and receiving the flow of carrier gas 2 separately and independently of each other, due to the piping. Of course, it is also possible to match up more than two heat storage modules 5a-d with a separately actuated heat storage pair, if the storage layout comprises more than four heat storage modules 5a-d.

According to FIGS. 5 and 6, two heat storage pairs are each hooked up in series with two heat storage modules 5a, 5b and 5c, 5d and successively receive the flow of hot carrier gas 2 from the gas heater 4a. The carrier gas 2 here is taken in a circuit per FIG. 5 through a circulation line 50 and, after exiting from the fourth heat storage module 5d shown at the right in FIG. 5, it returns across a compressor 3 to the gas heater 4a. The gas control is achieved by a suitable control system for a plurality of valves.

According to FIG. 6, a charging of the four heat storage modules 5a-d can also occur such that hot carrier gas 2 from the gas heater 4a flows through the two heat storage pairs with the heat storage modules 5a, 5b on the one hand and 5c, 5d on the other hand, in parallel. The carrier gas 2 exits with a specified target charge temperature from the gas heater 4a and is supplied with this temperature to the respective first heat storage module 5a or 5c of the respective heat storage pair. In this way, a complete charging is possible.

According to FIG. 6, the hot carrier gas 2 from the gas heater 4a is taken by a bypass line 43 past the two heat storage modules 5a, 5b of the first heat storage pair and thereby arrives at the heat storage module 5c of the heat storage pair shown at the right in FIG. 6. Furthermore, it is possible to supply hot carrier gas 2 from the gas heater 4a directly across a consumer line 44 to a consumer 45. The term "Consumer" in the sense of the invention encompasses any possible usage of the heat of the carrier gas 2 in a power plant process and/or gasification process.

Moreover, the connection per FIG. 6 allows fresh air 46 to be supplied via a further compressor 47 and a regulating line 52 to a mixing chamber 48, in order to appropriately regulate the temperature of the hot carrier gas 2 before being routed on to the consumer 45. The fresh air 46 in this case lies at a significantly lower temperature than the hot carrier gas 2 emerging from the gas heater 4a.

During the discharge of the heat storage modules 5a-d, it can be provided per FIG. 7 to supply fresh air 46, which forms the carrier gas 2, across the compressor 3, 47 and another bypass line 49 past the two heat storage modules 5c, 5d of the right-hand heat storage pair shown in FIG. 7 and to the right-hand heat storage module 5b of the left-hand heat storage pair shown in FIG. 7 at right. The fresh air 46 and the carrier gas 2 then flow through the two heat storage modules 5a, 5b of the heat storage pair shown in FIG. 7 at left and arrive across the bypass line 43 and the consumer line 44 at the consumer 45. Here as well, if needed a supply of fresh air 46 to the carrier gas 2 can be provided via the regulating line 52 and the mixing chamber 48 in order to adjust or regulate a particular utilization temperature of the carrier gas 2 for the power plant process and/or gasification process.

Moreover, per FIG. 7, if the target discharge temperature of the carrier gas 2 is too low upon exiting from the heat storage module 5a shown at far left in FIG. 7, it is possible to mix hot carrier gas 2 from the gas heater 4a with heated carrier gas 2 from the heat storage module 5a in order to achieve a utilization temperature of the carrier gas 2 as required by the consumer 46.

According to FIG. 8, fresh air 46 can be supplied across the compressor 47, 3 and a discharge line 51 to the last heat storage module 5d of the heat storage pair shown at right in FIG. 8. The carrier gas 2 heated in the heat storage modules 5c, 5d arrives by the bypass line 43 at the mixing chamber 48. Furthermore, fresh air 46 is supplied via the bypass line 49 to the heat storage modules 5a, 5b of the other heat storage pair and heated there. The carrier gas 2 heated in the heat storage modules 5a, 5b likewise arrives through the bypass line 43 at the mixing chamber 48. The two heat storage pairs are thus discharged in parallel, while the heat storage modules 5a, 5b and 5c, 5d of each heat storage pair in the series are discharged. Here as well, if need be, the temperature of the heated carrier gas 2 can be regulated by supplying fresh air 46 via the regulating line 52 to the mixing chamber 48. The carrier gas 2 then goes to the consumer 45. Basically, a direct supply of hot carrier gas 2 from the gas heater 4a to the mixing chamber 48 is also possible as needed, in order to increase the temperature of the carrier gas 2 heated in the heat storage modules 5a-d.

During the discharge of the heat storage modules 5a-d it is also possible for the flow through the heat storage modules 5a-d to start with the last heat storage module 5d shown at far right in FIG. 8 and thus go through the heat storage pairs in succession in the series connection.

| List of reference numbers: | |
| --- | --- |
| 1 | Storage power station |
| 2 | Carrier gas |
| 3 | Compressor |
| 4a-d | Gas heater |
| 5a-d | Heat storage module |
| 6 | Steam generator |
| 7 | Working fluid |
| 8 | Combustion chamber |
| 8a | Fuel gas |
| 9 | Electric heater |
| 10a-d | Partial stream |
| 11 | Collecting line |
| 12a-d | Supply valve |
| 13a-c | Three-way valve |
| 14 | Collecting line |

| -continued | |
| --- | --- |
| List of reference numbers: | |
| 15 | Outlet valve |
| 16 | Heat exchanger |
| 17 | Chimney |
| 18a-c | Supply line |
| 19a-d | Charging line |
| 20 | Supply valve |
| 21 | Preheater |
| 22 | Collecting line |
| 23a-d | Supply valve |
| 24a-d | Supply valve |
| 25 | Collecting line |
| 26a-d | Exit line |
| 27a-d | Bypass line |
| 28 | Expander |
| 29 | Preheater |
| 30 | Steam drum |
| 31 | Superheater |
| 32 | Steam turbine |
| 33 | Deaerator |
| 34 | Condenser |
| 35 | Circulation valve |
| 36 | Circulation valve |
| 37 | Circulation line |
| 38 | Return line |
| 39 | Return valve |
| 40 | Outlet valve |
| 41 | Outlet line |
| 42 | Combustion chamber |
| 43 | Bypass line |
| 44 | Consumption line |
| 45 | Consumer |
| 46 | Fresh air |
| 47 | Compressor |
| 48 | Mixing chamber |
| 49 | Bypass line |
| 50 | Circulation line |
| 51 | Discharge line |
| 52 | Regulating line |

The invention claimed is:

1. A method of compensating for load peaks during generating of electrical energy and/or for the generating of electrical energy by utilizing heat of heated carrier gas for the electricity generation, and/or for the utilization of the heat of the heated carrier gas for hydrogen generation, comprising:

heating of a carrier gas, including hot air, in at least one gas heater, wherein hot carrier gas with a specified target charge temperature exits from the gas heater, thermal charging of at least one heat storage module of a plurality of heat storage modules of the storage power station by releasing heat from the hot carrier gas from the gas heater to a heat storage material of the heat storage module, time-delayed thermal discharge of at least one heat storage module, wherein colder carrier gas, including cold air, flows through at least one heat storage module and heat from the heat storage material is transferred to the colder carrier gas for the heating of the carrier gas and wherein heated carrier gas with a specified discharge temperature exits from the heat storage module, and utilization of the heat transferred to the carrier gas in a process for electricity generation and/or hydrogen generation, wherein, during a discharge cycle, at least one heat storage module with a lower heat storage temperature and/or a lower usable heat content is fully discharged and at least one heat storage module with a higher heat storage temperature and/or a higher usable heat content is only partly discharged.

2. The method according to claim 1, wherein a heat transfer from carrier gas heated in at least one heat storage module to a working fluid of a steam power process in a power plant process, is provided.

3. The method according to claim 1, wherein a purely electrical heating of the carrier gas in at least one electrical air heater is provided by transforming electrical energy into thermal energy.

4. The method according to claim 1, wherein a plurality of heat storage modules are connected in series during the charging and heated carrier gas flows through them in succession, while an at least pairwise actuation of several heat storage modules is provided.

5. A method of compensating for load peaks during the generating of electrical energy and/or for the generating of electrical energy by utilizing the heat of heated carrier gas for the electricity generation, and/or for the utilization of the heat of the heated carrier gas for hydrogen generation, comprising:
heating of carrier gas, including hot air, in at least one gas heater, wherein hot carrier gas with a specified target charge temperature exits from the gas heater,
thermal charging of at least one heat storage module of a plurality of heat storage modules of the storage power station by releasing heat from the hot carrier gas from the gas heater to a heat storage material of the heat storage module,
time-delayed thermal discharge of at least one heat storage module, wherein colder carrier gas, including cold air, flows through at least one heat storage module and heat from the heat storage material is transferred to the colder carrier gas for the heating of the carrier gas and wherein heated carrier gas with a specified discharge temperature exits from the heat storage module, and
utilization of the heat transferred to the carrier gas in a process for electricity generation and/or hydrogen generation, wherein a plurality of heat storage modules connected in series form a heat storage series and heated carrier gas flows through them in succession during the charging, wherein the charging of a following heat storage module of the series is done at least partly by direct supply of hot carrier gas from a gas heater.

6. The method according to claim 1, wherein several heat storage modules are charged in parallel, each heat storage module being supplied with a separate hot carrier gas stream, and at least a pairwise actuation of several heat storage modules is provided.

7. The method according to claim 1, wherein several heat storage modules are charged in parallel, each heat storage module being supplied with a separate cold carrier gas stream, and at least a pairwise actuation of several heat storage modules is provided.

8. The method according to claim 1, wherein, during the discharge, carrier gas heated in at least one heat storage module is mixed with colder carrier gas and/or with cold air in order to adjust a certain target temperature for the heat transfer in a process for the production of electricity and/or hydrogen.

9. A method of compensating for load peaks during the generating of electrical energy and/or for the generating of electrical energy by utilizing the heat of heated carrier gas for the electricity generation, and/or for the utilization of the heat of the heated carrier gas for hydrogen generation, comprising:
heating of carrier gas, including hot air, in at least one gas heater, wherein hot carrier gas with a specified target charge temperature exits from the gas heater,
thermal charging of at least one heat storage module of a plurality of heat storage modules of the storage power station by releasing heat from the hot carrier gas from the gas heater to a heat storage material of the heat storage module,
time-delayed thermal discharge of at least one heat storage module, wherein colder carrier gas, including cold air, flows through at least one heat storage module and heat from the heat storage material is transferred to the colder carrier gas for the heating of the carrier gas and wherein heated carrier gas with a specified discharge temperature exits from the heat storage module, and
utilization of the heat transferred to the carrier gas in a process for electricity generation and/or hydrogen generation, wherein, during the discharge, carrier gas heated in at least one heat storage module is mixed directly with hot carrier gas from the gas heater in order to adjust a certain target temperature for the heat transfer in a process for the production of electricity and/or hydrogen.

10. The method according to claim 1, wherein heat transferred to the carrier gas in a gas heater is utilized directly, in a process for the production of electricity and/or hydrogen.

11. The method according to claim 1, wherein the carrier gas is carried in a circuit.

12. Thermoelectric storage power station for the utilization of the heat of heated carrier gas for the production of electricity, with at least one compressor for the compressing of the carrier gas, with at least one gas heater for the heating of the carrier gas, with a plurality of heat storage modules for the storing of the heat of heated carrier gas, with at least one heat exchanger for the transfer of the heat of heated carrier gas to a working fluid of a steam power process, designed to carry out a method according to claim 1.

13. A method according to claim 5, wherein charging of a following heat storage module of the series is done at least partly by direct supply of hot carrier gas from a gas heater if the exit temperature of the carrier gas from a preceding heat storage module of the heat storage series drops below a specified minimum temperature for the charging of the following heat storage module.

* * * * *

UNITED STATES PATENT AND TRADEMARK OFFICE
CERTIFICATE OF CORRECTION

PATENT NO. : 10,309,258 B2
APPLICATION NO. : 15/519622
DATED : June 4, 2019
INVENTOR(S) : Klaus Knop et al.

It is certified that error appears in the above-identified patent and that said Letters Patent is hereby corrected as shown below:

On the Title Page

At item (71) "Applicant", Column 1, Line 10, please delete "Cologne" and insert -- Koeln --, therefore.

At item (72) "Inventors", Column 1, Line 12, please delete "Cologne" and insert -- Koeln --, therefore.

At item (72) "Inventors", Column 1, Line 13, please delete "Cologne" and insert -- Koeln --, therefore.

Signed and Sealed this
Sixteenth Day of July, 2019

Andrei Iancu
*Director of the United States Patent and Trademark Office*